United States Patent Office 2,943,096
Patented June 28, 1960

2,943,096

PREPARATION OF MONOMERIC GLYCIDYL POLYETHERS OF POLYHYDRIC PHENOLS

Norman H. Reinking, Millington, N.J., assignor to Union Carbide Corporation, a corporation of New York No Drawing. Filed May 10, 1957, Ser. No. 658,232

16 Claims. (Cl. 260—348.6)

This invention relates to the production of glycidyl polyethers of polyhydric phenols by reacting a polyhydric phenol with epichlorohydrin to form a glycidyl polyether comprising as the principal product monomeric glycidyl polyether and only minor amounts of polymeric glycidyl ethers containing two or more aromatic hydrocarbon radicals alternating with glyceryl groups which are connected therewith through ether oxygen atoms.

More particularly, the invention is concerned with obtaining a reaction product containing as much as 85% by weight of monomeric glycidyl polyether and in minimizing the formation of polymeric glycidyl polyethers.

Glycidyl ethers of polyhydric phenols have usually been prepared by reacting a monoxyglycerol halohydrin with a phenol in the presence of an alkali catalyst. For example, epichlorohydrin reacts with bis(4-hydroxy phenyl)dimethylmethane, commonly known as Bisphenol A, in the presence of an alkali to form in addition to polymeric reaction products, the monomeric glycidyl ether of bis(4-hydroxy phenyl)dimethylmethane. This reaction may be represented by the following equation:

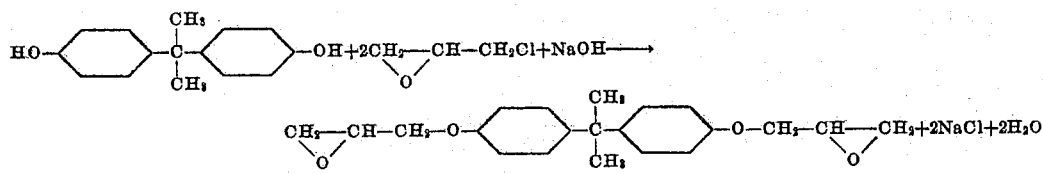

As represented by this equation one mole of epichlorohydrin is required for reaction with each phenolic hydroxy group. It has been found, however, that if these ratios are employed the yield of monomeric glycidyl polyether would be exceedingly small, at most about 10% by weight of the reaction product. The product would comprise predominately of high molecular weight polymers and condensation reaction products containing two or more aromatic hydrocarbon radicals alternating with glyceryl groups which are connected therewith through ether oxygen atoms. The following is a representative structural formula of the high molecular weight polymers obtained when two moles of epichlorohydrin per mole of Bisphenol A are reacted.

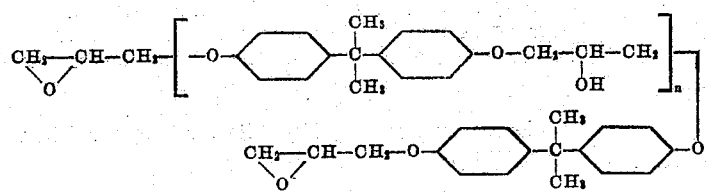

where $n$ has a value of from 1 to 15.

In order to increase the yields of monomeric glycidyl polyethers, it has been proposed to use an excess of epichlorohydrin, corresponding to from 2 to 3 times the stoichiometric amount. By this means it has been reported that monomeric glycidyl polyethers have been obtained in yields as high as 81 mole percent or 70% as expressed in parts by weight of the reaction product.

Another method which has been proposed in order to increase the yields of the monomeric glycidyl polyethers is one wherein only stoichiometric amounts of aqueous alkali have been used to neutralize the hydrogen chloride formed in the etherification reaction. Adding only a stoichiometric amount of aqueous alkali, however, results in an incomplete dehydrochlorination of the intermediate chlorohydrin ether. The dehydrohalogenation reaction is an equilibrium reaction and may be illustrated by the following equation wherein the intermediate chlorohydrin ether has been formed by reacting epichlorohydrin with Bisphenol A.

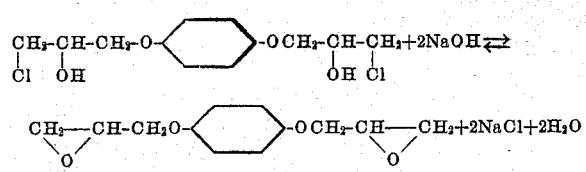

In order to drive the reaction to completion to the right, it is necessary to add an excess of the stoichiometric amount of caustic required for dehydrochlorination. On the other hand, an excess amount of alkali is to be avoided since it tends to increase the side reactions which decrease the yield of the monomeric glycidyl polyethers and are detrimental to the quality of said polyethers obtained.

Another proposal has been to add the aqueous alkali in amounts small enough to maintain the reaction mixture at an alkalinity less than that which colors phenolphthalein.

Still another proposal has been to carry out the reaction in the presence of hydroxylated solvents such as ethanol.

While these processes have alleged an increase in the yield of monomeric glycidyl polyethers, in actuality the yields have not exceeded about 70% by weight of the reaction product. These proposed processes are also deficient in that recovery of only a portion of the excess epihalohydrin is possible, at most about 85%.

I have now found a new and novel method of preparing monomeric glycidyl polyethers which eliminates the difficulties present in the processes formerly proposed. By my new and novel method there are obtained yields as high as 85 percent by weight of the monomeric glycidyl polyether based on the weight of the reaction product.

The proposed process also affords a method wherein the different reaction steps are integrated into a practically continuous process in which there is effected recovery of substantially 100% of the excess epichlorohydrin. The process is also advantageous in that recovery of practically 100% of the excess epihalohydrin eliminates a source of side reactions which are detrimental to the yield and quality of the monomeric glycidyl polyethers.

Another advantage is that the process affords a method by which lower viscosity products can be obtained in comparison with prior proposed methods.

My invention is based on the discovery that the yield of monomeric glycidyl polyether is unexpectedly increased by carrying out the reaction between epichlorohydrin and the polyhydric phenol in two stages, in the first stage forming the intermediate chlorohydrin ether by reacting the phenol and the epichlorohydrin under substantially anhydrous conditions and in the presence of a catalytic amount of a quaternary ammonium compound, and in the second stage forming the monomeric glycidyl polyether by dehydrohalogenating the intermediate halohydrin.

It is believed that the following reactions occur during the first stage as typically illustrated by the following equations, wherein MX is a quaternary ammonium compound.

First stage:

(a) 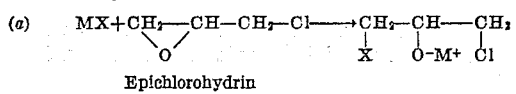

Epichlorohydrin (b) 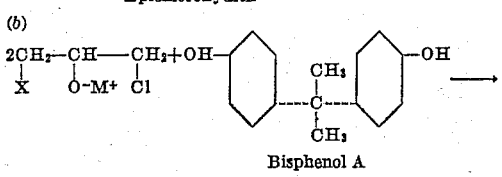

Bisphenol A

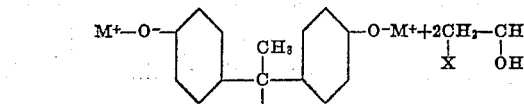

(c) 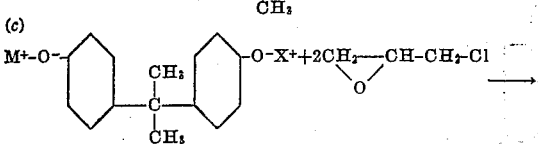

(d) 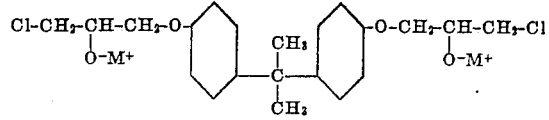

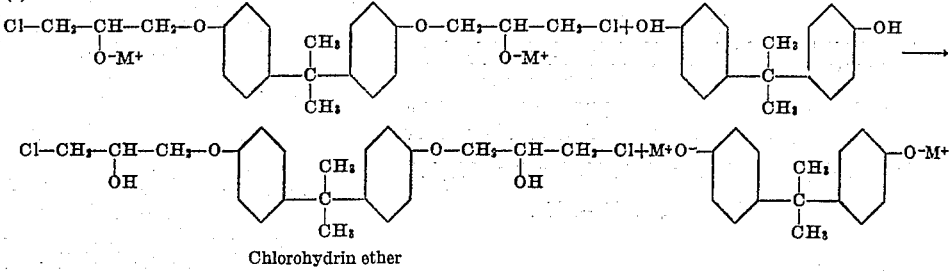

Chlorohydrin ether

According to these equations the phenoxide intermediate is continuously regenerated until all the phenolic hydroxyl groups have reacted with the epichlorohydrin.

Second stage:

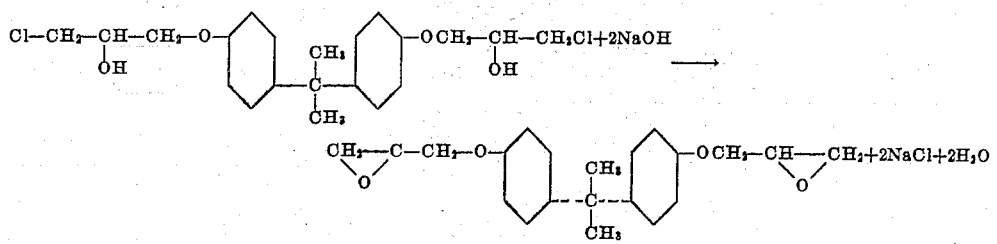

It has now been found that formation of undesirable polymerization and condensation reaction products may be substantially eliminated by conducting the stage one reaction in an anhydrous medium in the presence of a quaternary ammonium catalyst whereby substantially all of the phenolic hydroxyl groups react with the epichlorohydrin to form the corresponding halohydrin ether and by removing the unreacted epihalohydrin prior to the stage two dehydrohalogenation. It is essential to this invention that the stage one reaction be carried on in a substantially anhydrous medium. It has also been found advantageous to carry out the reaction in a medium free of hydroxylated solvents in order to insure that the epihalohydrin will not undergo a series of side reactions with subsequent formation of products which are not capable of easy removal from the system. These products contaminate the system, lowering the yield and quality of the final product.

The following equation represents the reaction which epihalohydrin undergoes in the presence of a hydroxylated solvent such as ethanol.

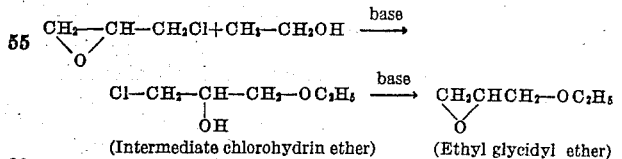

(Intermediate chlorohydrin ether)   (Ethyl glycidyl ether)

The ethyl glycidyl ether boils at 126° C., which is near the boiling point of epichlorohydrin (117° C.). In distilling off the excess epichlorohydrin any ethyl glycidyl ether or its intermediate chlorohydrin ether which has formed is recycled along with the epichlorohydrin back into the system. The glycidyl ether undergoes a reaction with the phenol to give an undesirable non-epoxy terminated product as typically illustrated by the following equation.

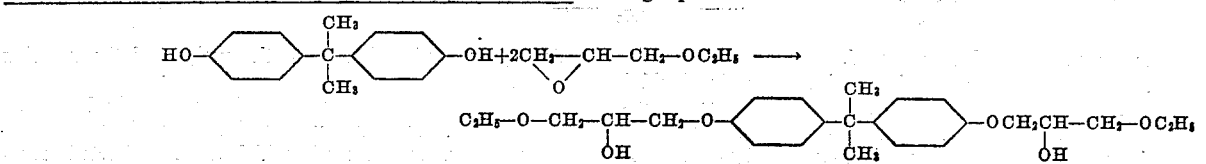

The non-epoxy terminated product increases the epoxy equivalent weight of the final product and also impairs the functionality of the product. This is manifested by a lower heat distortion temperature and flexural lower strength when the product is reacted with standard hardening agents.

Water in excess of 1% by weight in the first stage of the reaction system separates out as a water phase near the end of the coupling reaction. The water in separating as a distinct phase extracts substantial amounts of the coupling catalyst from the organic reaction medium, thus hindering the reaction between the epichlorohydrin and the polyhydric phenol.

The present process insures a quantitative coupling of the epihalohydrin and the phenolic compound. Moreover, by effecting a quantitative coupling in stage one to form the chlorohydrin ether to the substantial exclusion of condensation and polymerization products, the unreacted epihalohydrin may be easily removed before proceeding to the dehydrohalogenation stage.

It is essential to recover substantially all of the unreacted epihalohydrin, for if present in the dehydrohalogenation step, it will react with the alkali solution to form such heat sensitive compounds as glycidol, as shown in the following equation.

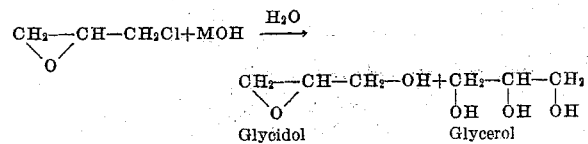

Glycidol   Glycerol

The glycidol formed according to this equation is sensitive to heat. It tends to polymerize, forming undesirable products which remain in the glycidyl polyethers, thus increasing the viscosity of these ethers. Moreover, it is necessary to recover the unreacted epihalohydrin in order to make the process commercially feasible.

It is also essential to this process that a quaternary ammonium compound be employed to effect the coupling of the epihalohydrin and the polyhydric phenol. It has been found that catalysts usually employed in this type reaction are unsuitable as they undergo side reactions with the epihalohydrin to form undesirable higher molecular weight derivatives. One such side reaction is represented by the following equations:

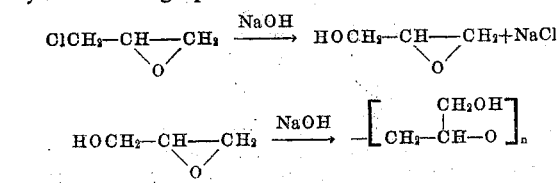

where $n$ has a value of from 1 to 20.

The base catalysts formerly proposed are also undesirable for they cause premature formation of glycidyl polyethers which, being in admixture with the unreacted phenol and chlorohydrin ethers, react therewith to form undesirable high molecular weight reaction products. These reactions are illustrated by the following equations:

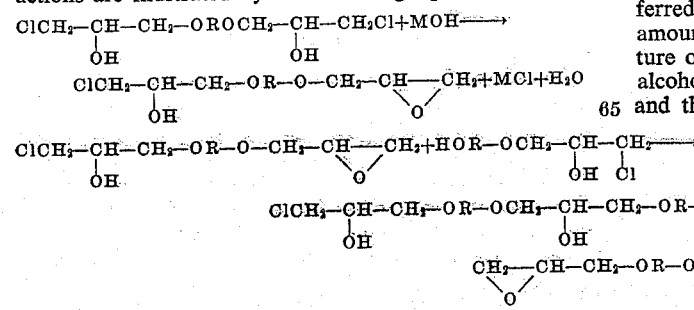

I have now found that the quaternary ammonium type compounds such as tetramethyl ammonium chloride, benzyl trimethyl ammonium chloride, tetraethanol ammonium chloride, tetraethanol ammonium hydroxide, and dodecyl dimethylbenzyl ammonium naphthenate effect a quantitative coupling of the epihalohydrin and a polyhydric phenol in a substantially anhydrous medium free of organic hydroxylated solvents forming the intermediate chlorohydrin ether to the exclusion of substantial formation of undesirable polymeric side products. Furthermore, the quaternary ammonium compounds do not incorporate into the glycidyl polyether product and hence are easily removed from the system.

The quaternary ammonium compounds of this invention are also advantageous as catalysts as they do not precipitate out of the reaction medium. These catalysts remain available, therefore, for effectively catalyzing the coupling reaction essentially to completion. On the other hand, base catalysts formerly proposed are unsuitable for use in a substantially anhydrous non-hydroxylated medium as they undergo a reaction with the intermediate chlorohydrin ether, formed in the coupling reaction between the epichlorohydrin and the said phenol, and precipitate out of the reaction medium as insoluble chlorides. This reaction may be typically illustrated by the following equation wherein R is a fragment of a polyhydric phenol.

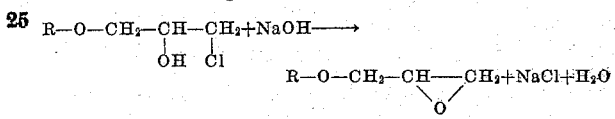

As illustrated by the foregoing equation, therefore, the base catalysts formerly used, as exemplified by sodium hydroxide, on reaction with the intermediate ether form chlorides which precipitates out of the reaction medium. The reaction of the base to form insoluble chlorides removes the base as an effective coupling catalyst. This elimination results on incomplete coupling of the epichlorohydrin and the polyhydric phenol.

The concentration of the ammonium compounds in the reaction medium in the first stage should be sufficient at least, to color phenolphthalein. Preferably, the quaternary ammonium compounds are employed in concentrations of between 0.01 and 0.05 mole per each phenolic hydroxyl group.

It has also been found that the first stage coupling reaction should be conducted at temperatures not exceeding 60° C. Temperatures in excess of 60° C. lead to the formation of undesirable polymeric compounds. Temperatures of about 40° C. or lower have been found most suitable since at lower temperatures better yields and better quality glycidyl polyethers are obtained. The lower the temperature, however, the longer is the reaction time necessary for the first stage coupling to occur. For example, at room temperature, about 25° C., the time of reaction is 72 hours.

Following the removal of excess epihalohydrin from the reaction medium using standard low pressure, short contact time distillation techniques, the dehydrochlorination of the intermediate halohydrin ether can be continuously carried out in a liquid medium using as much as a 20% excess of a stoichiometric amount of a base. It is preferred, however, that a 5% excess of the stoichiometric amount be used. The liquid medium is preferably a mixture of solvents comprising (1) a volatile, water-soluble alcohol or ketone, which is a solvent for the epihalohydrin and the aqueous caustic, such as ethanol, acetone, isopropanol, dioxane, butanol, and methanol, and (2) a hydrocarbon or ether which is relatively insoluble in water

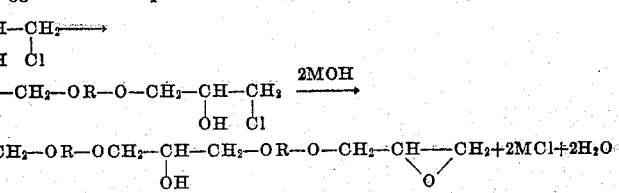

but which is a solvent for the glycidyl ether, such as toluene, xylene and isopropyl ether.

By the use of a mixture of water-soluble and water-insoluble solvents, the base is precluded from attacking and destroying the glycidyl polyethers. If only a water-soluble solvent such as methanol were used there would be a completely homogeneous solution in which the base would readily attack the glycidyl polyether to produce hydrolyzed or partially polymerized by-products. On the other hand, if only a water-insoluble solvent were used, the rate of dehydrochlorination would be too slow to be practical.

The ratio of water-insoluble solvent to water-soluble solvent may be varied between about a 1:1 and 3:1 ratio by weight.

The usual method of dehydrochlorination of chlorohydrin ether has been carried out batchwise. It has now been found that the dehydrochlorination may be carried out by a continuous process which allows for the recycling of the solvents used to solvate the intermediate chlorohydrin ether. This continuous process affords a method by which the dehydrohalogenation may be carried out more quickly and economically than the batch processes used heretofore. The advantages inherent in this continuous aspect of the process make it more feasible for the commercial preparation of a reaction product containing a major amount of monomeric glycidyl polyether.

It has also been found that the dehydrochlorination may be advantageously carried out using up to about 20% in excess of the stoichiometric amount of base with the concentration of the caustic solution being about 18% or less. The concentration of the caustic solution is kept at 18% or lower, for if a solution of higher concentration were used, sodium chloride formed in the dehydrohalogenating step would precipitate out of solution. The salt precipitate would tend to clog the apparatus necessitating a series of steps to eliminate the precipitate from the system. A solution of 18% concentration or less also provides a sufficient amount of water to wash out substantially all of the quaternary ammonium catalyst from the glycidyl polyether product. It is also advantageous to add the caustic solution in two stages. Usually, 75% of the total amount of caustic is added in the first stage and 25% of the caustic is added in the second stage. Each addition of caustic is followed by a settling and decantation step to eliminate the brine layer.

The two-stage addition of caustic is used in the dehydrochlorination step in order to (1) prevent damage to the intermediate ether product which would occur as a result of a single addition of a caustic solution and (2) to enable removal of the brine solution after each addition to insure that the dehydrochlorination reaction goes to completion.

The speed of the dehydrohalogenation reaction depends to a large extent on the temperature. Temperatures of between 40°–70° C. are preferred. At these temperatures the density of the water phase and organic phase is such that there is a clear separation of the phases into two layers, with the aqueous brine being the bottom layer.

The dehydrochlorination compounds which may be used in the dehydrohalogenation step are the caustics such as sodium and potassium hydroxide.

By the term "polyhydric phenols" there is intended to be included the mononuclear polyhydric phenols such as resorcinol and pyrogallol, the di- or polynuclear phenols such as the bisphenols described in the Bender et al. United States Patent No. 2,506,486 and polyphenylols such as the novolak condensation product of a phenol and a saturated or unsaturated aldehyde containing an average of from 3 to 20 or more phenylol groups per molecule (cf. book by T. S. Carswell entitled "Phenoplasts," published in 1947 by Interscience Publishers of New York). Exemplary of suitable polyphenylols derived from a phenol and an unsaturated aldehyde such as acrolein, are the triphenylols, pentaphenylols and heptaphenylols described in copending application S.N. 368,514, filed July 16, 1953, now U.S. Patent 2,885,385 and copending application S.N. 422,275, filed April 9, 1954, now U.S. Patent 2,801,989, by A. G. Farnham.

The phenols may contain alkyl or aryl ring substituents or halogens, as exemplified by the alkyl resorcinols, the tribromo resorcinol and the diphenols containing alkyl and halogen substituents on the aromatic ring (Bender et al., U.S. Patent 2,506,486).

The polyhydric polynuclear phenols can consist of 2 or more phenols connected by such groups as methylene, alkyl, alkylene or sulfone. The connecting groups are further exemplified by the compounds having the following formulas.

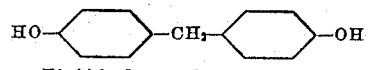

Bis(4-hydroxy phenyl)methane

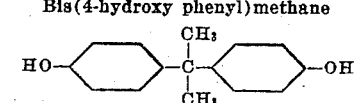

Bis(4-hydroxy phenyl)dimethylmethane

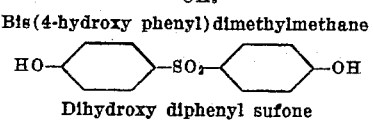

Dihydroxy diphenyl sufone

A trisphenol having the formula

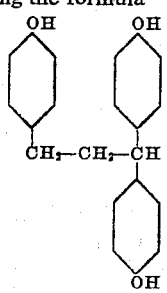

A tetraphenol having the formula

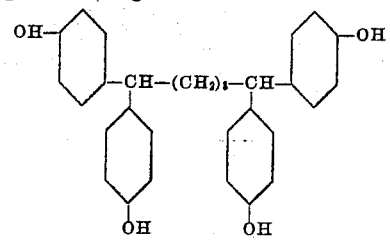

The epihalohydrin of the present invention is preferably epichlorohydrin. An excess of the stoichiometric amount of epichlorohydrin is used in the reaction, preferably at least 3 moles per each phenolic hydroxyl group. The amount of epihalohydrin is dependent in part on the catalyst and the reaction temperature. For example, with tetramethyl ammonium chloride as the catalyst, 6 moles of epichlorohydrin were used per mole of Bisphenol A with a reaction temperature of 40° C. and time of reaction, 26 hours.

The first stage of this process is conducted by admixing a polyhydric phenol with excess epichlorohydrin in the presence of a quaternary ammonium catalyst. The mixture is heated to a temperature of about 40° C. The time required to complete the first stage reaction using 0.07 mole of catalyst per mole of Bisphenol A is about 26 hours. The progress of the first stage coupling reaction may be determined by an epoxy analysis of the unreacted epihalohydrin and by an ultra-violet spectrophotometric analysis by which the percent of unreacted phenolic hydroxyl groups is measured. After completion of the coupling reaction which is indicated by the substantial absence of phenolic hydroxyl groups, the unreacted epichlorohydrin is distilled off under a vacuum of 25 mm. Hg at a temperature of 130° C. The epichlorohydrin distillate is treated to convert any glycerol dichlorohydrin which may have formed in the reaction to epichlorohydrin and thereafter the distillate is recycled to the stage one reaction medium. From this point on the process becomes continuous. The residue, a viscous liquid containing the chlorohydrin ether of the polyhydric phenol is dissolved in a mixture of solvents, for example toluene and ethanol. The solvents are used in mixtures ranging between 1:1 and 3:1 parts by weight of water-insoluble solvents to water-soluble solvents and in amounts such that a 45% solution with respect to the chlorohydrin ether is formed.

Instead of toluene, xylene or isopropyl ether may be used, and instead of ethanol, acetone, dioxane, isopropanol, butanol, or methanol may be used.

To the solvated residue there is added in two stages a water solution containing 18% or less by weight of a caustic at temperatures ranging from 40–70° C., preferably 55–60° C. In stage one, 75% of the solution is added. In stage two the remaining amount of solution is added. The amount of caustic solution ranges from a stoichiometric amount to 20% in excess of the stoichiometric amount necessary to dehydrochlorinate the intermediate chlorohydrin ethers.

The organic layer containing the organic solvents and the crude glycidyl polyether product is decanted from the brine layer after each addition of caustic solution. The organic solvent is stripped from the crude glycidyl polyether product under reduced pressures and at a residue temperature of about 120° C. The organic solvent which is separated from the product is recycled. The residue containing the glycidyl polyether is finally stripped under a vacuum at a temperature of about 150° C. to obtain the final glycidyl polyether product. The product is analyzed for its epoxy equivalent by heating one gram of the ether product at the boiling point of pyridine for 20 minutes in the presence of an excess of pyridine containing pyridine hydrochloride (made by adding 16 cc. of concentrated hydrochloric acid per liter of pyridine). The excess pyridine hydrochloride is back titrated with 0.1 Normal sodium hydroxide using phenol phthalein as the indicator. One mole of the hydrochloric acid is considered equivalent to one epoxide group. The result is expressed as "epoxy equivalent" which means the number of grams of product that contain one mole equivalent of epoxy. The yield of the monomeric glycidyl polyether may be expressed as percent by weight based on the weight of the total product obtained. The percent by weight is calculated on the basis of the epoxy equivalent.

The following examples further illustrate the process of this invention without limiting in any way the scope of the invention.

*Example I*

One mole of bis(4-hydroxy phenyl)dimethylmethane, 6 moles of epichlorohydrin and 0.07 mole of tetramethyl ammonium chloride were admixed and heated. The temperature was maintained at 40° C. for 26 hours. This step is a mildly exothermic reaction releasing approximately 76 B.t.u. per pound of charge. The progress of the reaction was followed by measuring the content of unreacted bisphenol in the reaction medium. The completion of the first stage of the process was indicated by a substantial absence of unreacted bisphenol using ultraviolet spectrophotometric tests. Coupling efficiency corresponded to 98% of the total phenol reacted. Using 30,000 lbs. of chlorohydrin ether prepared by the process of reacting epichlorohydrin with bis(4-hydroxy phenyl) dimethylmethane as noted above, the chlorohydrin product was fed at a rate of 246.5 lbs. per hour into a co-current turbulent film evaporator. The evaporator was heated by steam which was run through the annular heating space of the evaporator at a rate of 50 p.s.i.g. The ether was passed through the heated evaporator at a pressure maintained between 25–30 mm. The temperature of the material was maintained at 130° C. Unreacted epichlorohydrin was evaporated at the rate of 125.5 lbs. per hour and subsequently treated with sodium hydroxide or lime to convert any glycerol dichlorohydrin which may have formed in the reaction to epichlorohydrin. Epichlorohydrin thusly treated, was recycled for reaction with additional phenolic material. The intermediate chlorohydrin ether, a viscous liquid, was fed to the solvation line mixer tank at a rate of 121 lbs. per hour and solvated with a recycle toluene-ethanol mixture. The toluene-ethanol recycle was fed into the solvation line mixer at the rate of 128 lbs. per hour after which the solvated mixture was transferred to a cooler where the solution was cooled to 40° C. The cooled solution was then transferred to a reactor feed mix adjusting tank. The alcohol content of the toluene ethanol recycle had been determined by a refractive index prior to recycling. At this stage the toluene-ethanol ratio was adjusted to 3:1 and further additions of solvent were made to obtain a solution containing a solids content of 45 percent. The rate of feed of the alcohol into the adjusting tank was 6.4 lbs. per hour. The rate of feed of the toluene was 4.1 lbs. per hour, while the rate of feed of the solution from the cooler into the reactor feed mix adjusting tank was 121 lbs. per hour. From the adjusting tank the solution was fed into two overflow reactors at an average rate of 257.4 lbs. per hour. In these reactors the solution was treated with a caustic solution having a concentration of 18% by weight of sodium hydroxide. Sufficient caustic was added to provide an excess of 5% of the stoichiometric amount required for complete dehydrochlorination of the intermediate ethers.

Seventy-five percent of the total caustic was added to the first reactor at a rate of 82.5 lbs. per hour. The remaining caustic was added to the second reactor also at 27.5 lbs. per hour. After each addition of caustic the material was fed first into a holding tank and then into a decantation tank where the brine layer was separated from the organic layer. The dehydrochlorinating steps were carried out at a temperature of 55° C. The rate of feed from the first reactor into the second reactor was maintained at an average of 257.4 lbs. per hour. Additional alcohol was also added to second reactor at the rate of 16 lbs. per hour in order to maintain a toluene-alcohol ratio of 3:1. The organic phase containing the crude glycidyl polyether product was fed to a forced circulation evaporator which was operated at a pressure of 200 mm. of mercury at a temperature sufficient to provide a material temperature of 120° C. The solvents were stripped from the glycidyl polyether product in this step and recycled back to the solvation stage. The crude glycidyl polyether was finally stripped under a pressure of about 30 mm. at 150° C. to the final product.

The stripped glycidyl polyether of Bisphenol A had an epoxy equivalency of 189, a viscosity of 12,100 centistokes and a color on the Gardner scale of 5. Based on the epoxy equivalency the content of monomeric glycidyl polyether was calculated as 78% by weight of the total weight of the product. The remaining product comprised essentially high molecular weight polymers. The amount of catalyst taken up by the product as manifested by the amount of nitrogen present in the product was less than 0.01%. The amount of unreacted epichlorohydrin recovered was 100%.

The glycidyl polyether product was hardened with 4,4'-methylene dianiline by admixing the two components and curing for 20 hours at 85° C. and thereafter annealing for 3 hours at 160° C. Sufficient quantity of reactants was used to provide one equivalent of epoxy per each amino hydrogen. The glycidyl polyether product using standard ASTM procedures was found to have a heat distortion in degrees centigrade of 160°. Its flexural strength at room temperature was 16,900 p.s.i. At 132° C. the flexural strength was 8030 p.s.i.

Example II

One mole of bis(4-hydroxy phenyl)dimethylmethane and 6 moles of epichlorohydrin were admixed in the presence of 0.07 mole of benzyl trimethyl ammonium chloride. The mixture was heated at 40° C. for 20 hours whereby the phenol and epichlorohydrin reacted to form the corresponding chlorohydrin ether product. Thirty thousand pounds of the precoupled chlorohydrin ether prepared as noted above were continuously dehydrochlorinated to form the glycidyl polyether of bis(4-hydroxy phenyl)dimethylmethane by a process as defined in Example I.

The glycidyl polyether product had an epoxy equivalency of 183, a viscosity of 10,000 centistokes and a color on the Gardner scale of 5. Based on the epoxy equivalency the content of monomeric glycidyl polyether was calculated as 84.5% by weight of the total weight of the product. The remaining product comprised essentially high molecular weight polymers. The product was free of any nitrogen indicating that no amount of catalyst remained in the product. There was a 100% recovery of the unreacted epichlorohydrin.

The glycidyl polyether product was hardened with 4,4'-methylene dianiline by admixing the two components and curing for 20 hours at 85° C. and thereafter annealing for 3 hours at 160° C. Sufficient quantity of reactants was used to provide one equivalent of epoxy per each amino hydrogen. Using standard ASTM procedures, the glycidyl polyether was found to have a heat distortion in degrees centigrade of 163. The flexural strength at room temperature was 17,200 p.s.i. At 132° C., the flexural strength was 8400 p.s.i.

What is claimed is:

1. Process for the preparation of glycidyl polyethers of polyhydric phenols which comprises reacting a substantially anhydrous mixture containing a polyhydric phenol, epichlorohydrin in an amount sufficient to provide at least about 3 moles of epichlorohydrin per phenolic hydroxyl group, and a catalytic amount of a base-generating quaternary ammonium compound on reaction with epichlorohydrin, until substantially all of the said phenol has been converted to its chlorohydrin ether, removing the unreacted epichlorohydrin from said chlorohydrin ether and subjecting said chlorohydrin ether to substantially complete dehydrochlorination.

2. Process as defined in claim 1 wherein the polyhydric phenol is bis(4-hydroxy phenyl)dimethylmethane.

3. Process as defined in claim 1 wherein the quaternary ammonium compound is tetramethyl ammonium chloride.

4. Process as defined in claim 1 wherein the quaternary ammonium compound is benzyl trimethyl ammonium chloride.

5. Process as defined in claim 1 wherein the quaternary ammonium compound is tetraethanol ammonium chloride.

6. Process as defined in claim 1 wherein the quaternary ammonium compound is tetraethanol ammonium hydroxide.

7. Process as defined in claim 1 wherein the quaternary ammonium compound is dodecyl dimethyl benzyl ammonium naphthenate.

8. Process as defined in claim 1 wherein the mixture, during the conversion of substantially all of the said phenol to its chlorohydrin ether, is free of organic hydroxylated solvents.

9. Process for the preparation of glycidyl polyethers of polyhydric phenols which comprises reacting at a temperature below about 60° C. a substantially anhydrous mixture containing a polyhydric phenol, epichlorohydrin in an amount sufficient to provide at least about 3 moles of epichlorohydrin per phenolic hydroxyl group, and a catalytic amount of a base-generating quaternary ammonium compound on reaction with epichlorohydrin, until substantially all of the said phenol has been converted to its chlorohydrin ether, removing the unreacted epichlorohydrin from said chlorohydrin ether and subjecting said chlorohydrin ether to substantially complete dehydrochlorination by adding thereto an excess of the stoichiometric amount of caustic required for complete dehydrochlorination.

10. Process as defined in claim 9 wherein the reaction mixture, during the conversion of substantially all of the said phenol to its chlorohydrin ether, is free of organic hydroxylated solvents.

11. Process as defined in claim 9 wherein the amount of caustic added to dehydrochlorinate the intermediate chlorohydrin ether is 5% in excess of the stoichiometric amount.

12. Process for the preparation of glycidyl polyethers of polyhydric phenols which comprises reacting a substantially anhydrous mixture containing a polyhydric phenol, epichlorohydrin in an amount sufficient to provide at least about 3 moles of epichlorohydrin per phenolic hydroxyl group, and a catalytic amount of a base-generating quaternary ammonium compound on reaction with epichlorohydrin, until substantially all of the said phenol has been converted to its chlorohydrin ether, removing the unreacted epichlorohydrin from said chlorohydrin ether, solvating the said chlorohydrin ether with an organic solvent comprising a mixture of a water-soluble liquid selected from the group consisting of alcohols, ketones, and dioxane, and a water-insoluble liquid selected from the group consisting of hydrocarbons and isopropyl ether, subjecting said chlorohydrin ether to substantially complete dehydrochlorination by adding to said chlorohydrin ether a substantially stoichiometric amount of caustic required for complete dehydrochlorination.

13. Process as defined in claim 12 wherein the ratio of water-soluble solvent to water-insoluble solvent is 1:3.

14. Process as defined in claim 12 wherein the water-insoluble solvent is toluene.

15. Process as defined in claim 12 wherein the water-soluble solvent is ethanol.

16. Process for the preparation of glycidyl polyethers of polyhydric phenols which comprises reacting a mixture containing a polyhydric phenol, epichlorohydrin in an amount sufficient to provide at least about 3 moles of epichlorohydrin per phenolic hydroxyl group, and a catalytic amount of a base-generating quaternary ammonium compound on reaction with epichlorohydrin unitl substantially all of the said phenol has been converted to its chlorohydrin ether, removing the unreacted epichlorohydrin and glycerol dichlorohydrin from said chlorohydrin ether, solvating said chlorohydrin ether with an organic solvent comprising a mixture of a water- soluble liquid and a water-insoluble liquid, adding to said solvated ether an aqueous solution of a caustic in an amount of about 75% of the stoichiometric amount required for complete dehydrochlorination of said ether, thereby forming a two-phase mixture comprising an aqueous layer containing the chloride salt of said caustic and the catalyst residue, and an organic layer containing glycidyl polyether and chlorohydrin ether, separating the aqueous layer from the organic layer, adding to said organic layer a sufficient amount of caustic to substantially complete the dehydrochlorination of the said chlorohydrin ether, whereby an aqueous layer and organic layer are formed, separating said aqueous layer from said organic layer and recovering the glycidyl polyether from said organic layer.

References Cited in the file of this patent

UNITED STATES PATENTS

| | | |
|---|---|---|
| 2,712,000 | Zech | June 28, 1955 |
| 2,744,691 | Schroeder et al. | Dec. 18, 1956 |
| 2,772,296 | Mueller | Nov. 27, 1956 |
| 2,809,942 | Cooke | Oct. 15, 1957 |